(12) United States Patent
Watanabe

(10) Patent No.: US 12,299,720 B2
(45) Date of Patent: May 13, 2025

(54) SYSTEM, METHOD, AND COMPUTER-READABLE STORAGE MEDIUM

(71) Applicant: HONDA MOTOR CO., LTD., Tokyo (JP)

(72) Inventor: Daichi Watanabe, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 502 days.

(21) Appl. No.: 17/671,610

(22) Filed: Feb. 15, 2022

(65) Prior Publication Data

US 2022/0318865 A1 Oct. 6, 2022

(30) Foreign Application Priority Data

Mar. 31, 2021 (JP) ................................. 2021-061389

(51) Int. Cl.
*G06Q 30/04* (2012.01)
*G06Q 30/0645* (2023.01)

(52) U.S. Cl.
CPC ......... *G06Q 30/04* (2013.01); *G06Q 30/0645* (2013.01)

(58) Field of Classification Search
CPC .......................... G06Q 30/04; G06Q 30/0645
See application file for complete search history.

(56) References Cited

U.S. PATENT DOCUMENTS

| | | | |
|---|---|---|---|
| 2016/0099590 A1* | 4/2016 | Velderman | G07F 7/06 320/113 |
| 2020/0009983 A1* | 1/2020 | Oshima | B60L 53/80 |
| 2020/0018800 A1* | 1/2020 | Oshima | G07C 3/00 |
| 2020/0031413 A1* | 1/2020 | Chen | G07F 9/002 |
| 2022/0285781 A1* | 9/2022 | Renfro | H01M 50/264 |

FOREIGN PATENT DOCUMENTS

JP 2020177652 A 10/2020

* cited by examiner

*Primary Examiner* — A. Hunter Wilder
*Assistant Examiner* — Joseph M Mutschler

(57) ABSTRACT

A system is provided including a communication section that receives, from an external apparatus that can connect to a battery pack, battery pack information including first identification information of the battery pack and second identification information of an electric apparatus that utilizes electrical power accumulated in the battery pack, and an identification section that identifies the number of times the battery pack has been replaced among the plurality of electric apparatuses based on the battery pack information, and identifies the discount rate of the battery pack based on the identified number of times and the discount rate table.

20 Claims, 12 Drawing Sheets

| BATTERY PACK ID | FINAL PRODUCT ID | ID ACQUISITION DATE AND TIME | DEGRADATION RATE AT THE START OF USE OF BATTERY PACK | USE END DATE | DEGRADATION RATE AT THE END OF USE OF BATTERY PACK | NUMBER OF TIMES PRODUCTS ARE LOADED | DISCOUNT RATE |
|---|---|---|---|---|---|---|---|
| AA0001 | XXXX001 | 2021/1/1 8:30 | 100 | 2021/1/1 17:00 | 99 | 1 | 0 |
| AA0001 | XXXX001 | 2021/1/2 8:30 | 99 | 2021/1/2 17:00 | 98 | 1 | 0 |
| | | | (OMISSION) | | | | |
| AA0001 | XXXX001 | 2022/10/31 8:30 | 91 | 2022/10/31 17:00 | 90 | 1 | 0 |
| AA0001 | YYYY002 | 2023/1/1 8:30 | 90 | 2023/1/1 17:00 | 89 | 2 | X4 |
| ... | ... | | ... | ... | ... | ... | |

FIG.5

| DISCOUNT RATE ON USE FEE OF BATTERY / % | | NUMBER OF TIMES PRODUCTS ARE LOADED | | | |
|---|---|---|---|---|---|
| | | 1 | 2 | 3 | 4 |
| DEGRA-DATION LEVEL | A (GOOD) | 0 | X4 | X5 | X6 |
| | B | 0 | X3 | X4 | X5 |
| | C | 0 | X2 | X3 | X4 |
| | D (POOR) | 0 | X1 | X2 | X3 |

*FIG.6*

| BATTERY PACK ID | FINAL PRODUCT ID | ID ACQUISITION DATE AND TIME | DEGRADATION RATE AT THE START OF USE OF BATTERY PACK | USE END DATE | DEGRADATION RATE AT THE END OF USE OF BATTERY PACK | NUMBER OF TIMES PRODUCTS ARE LOADED | DISCOUNT RATE | USE FEE |
|---|---|---|---|---|---|---|---|---|
| AA001 | XXXX001 | 2021/1/1 8:30 | 100 | 2021/1/1 17:00 | 99 | 1 | 0 | Q1 |
| AA001 | XXXX001 | 2021/1/2 8:30 | 99 | 2021/1/2 17:00 | 98 | 1 | 0 | Q1 |
| (OMISSION) | | | | | | | | |
| AA001 | XXXX001 | 2022/10/31 8:30 | 91 | 2022/10/31 17:00 | 90 | 1 | 0 | Q1 |
| AA001 | YYYY002 | 2023/1/1 8:30 | 90 | 2023/1/1 17:00 | 89 | 2 | X4 | Q1*X4 |
| ... | | | | | | | | |

FIG. 10

SYSTEM, METHOD, AND COMPUTER-READABLE STORAGE MEDIUM

The contents of the following Japanese patent application (s) are incorporated herein by reference:
NO. 2021-061389 filed in JP on Mar. 31, 2021

BACKGROUND

1. Technical Field

The present invention relates to a system, a method, and a computer-readable storage medium.

2. Related Art

Patent document 1 describes that "the rental fee of a battery is determined in consideration of the degradation of the battery" (paragraph [0006]).

PRIOR ART DOCUMENT

[Patent Document]

[Patent document 1] Japanese Patent Application Publication No. 2020-177652

BRIEF DESCRIPTION OF THE DRAWINGS

FIG. 5 is one example of a battery pack information table stored in a storage section 105 of the management server 100 in one embodiment.

FIG. 6 is one example of a discount rate table stored in the storage section 105 of the management server 100 in one embodiment.

FIG. 10 is one example of a battery pack information table stored in the storage section 105 of the management server 100 in one embodiment.

DESCRIPTION OF EXEMPLARY EMBODIMENTS

Hereinafter, the present invention will be described through embodiments of the invention, but the following embodiments do not limit the invention according to the claims. In addition, not all combinations of features described in the embodiments are essential to the solution of the invention.

Figure 1:
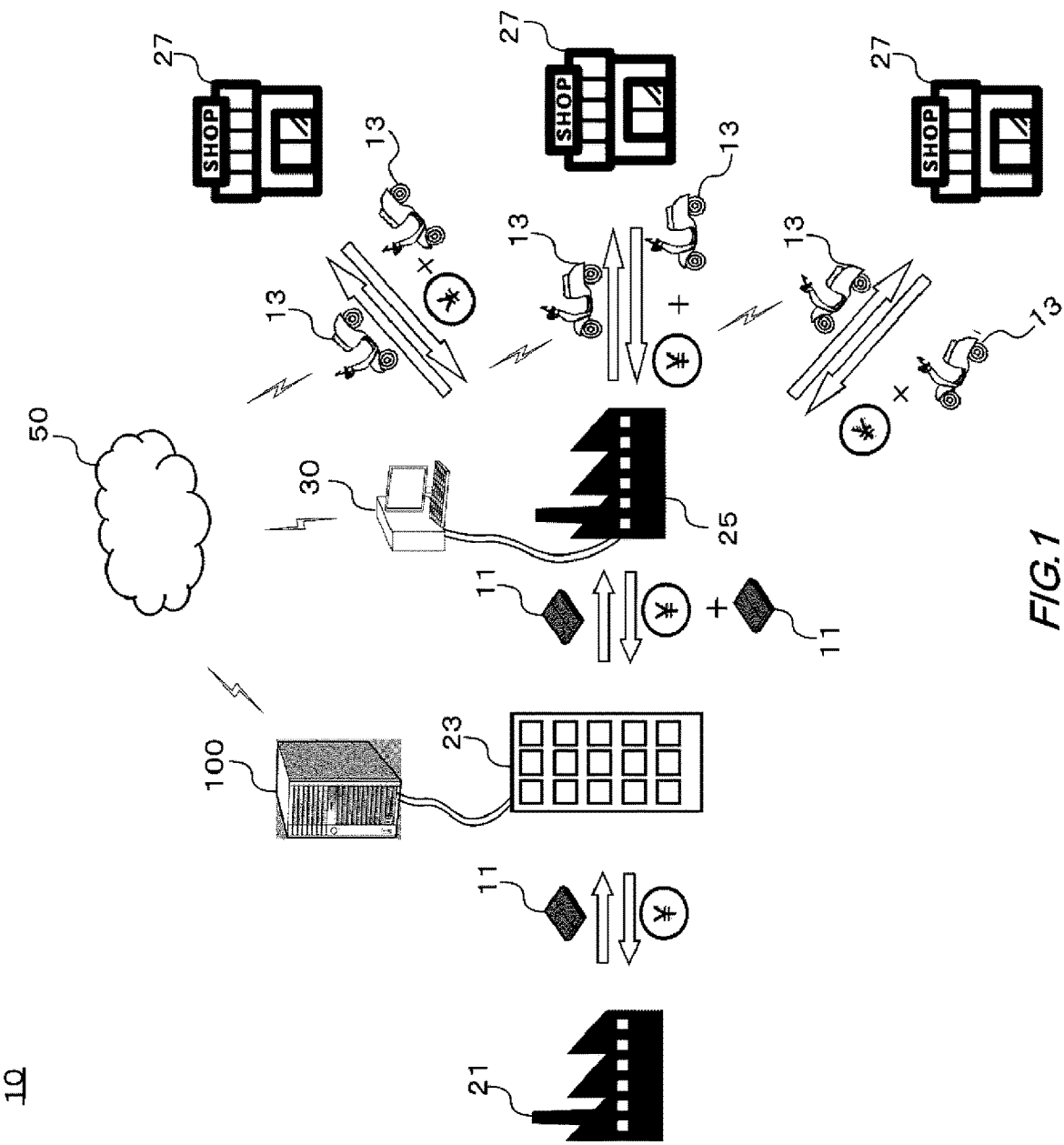
FIG. 1 is a schematic view of a lease fee calculation system 10 in one embodiment.

FIG. 1 is a schematic view of a lease fee calculation system 10 in one embodiment. The lease fee calculation system 10 includes a final product 13, a management server 100, and an information terminal 30. The management server 100 communicates with the final product 13 and the information terminal 30 via a communication network 50. The communication network 50 may include an IP network such as the Internet, a P2P network, a dedicated line including VPN, a virtual network, or the like.

The lease fee calculation system 10 in the present embodiment further includes a battery pack manufacture 21 that produces the battery pack 11 and an intermediary agent 23 that purchases the battery pack 11 from the battery pack manufacture 21 and leases it to another company. The lease fee calculation system 10 in the present embodiment further includes a final product manufacture 25 that produces a final product 13 using the battery pack 11 provided by the intermediary agent 23 under a lease contract and a final product operator 27 that operates the final product 13 provided by the final product manufacture 25.

The lease fee calculation system 10 is a system for deploying one battery pack 11 to a plurality of final products 13, i.e. increasing the operation rate of the battery pack 11. The lease fee calculation system 10 is meant for fully utilizing the battery pack 11 produced from limited resources. In other words, the lease fee calculation system 10 is meant for efficiently utilizing the limited resources to meet the demand for the battery pack 11 in the electrification society in the future.

The final product manufacture 25 pays a use fee, i.e. a lease fee, to the intermediary agent 23 in exchange for receiving the provision of the battery pack 11 under the lease contract. Similarly, the final product operator 27 pays the use fee to the final product manufacture 25 in exchange for receiving the provision of the final product 13 loaded with the battery pack 11. Such a use fee is paid to the provider when, as one example, the provided object is returned to the provider. Additionally or alternatively, such a use fee may be paid on a regular basis during the use period of the provided object. It should be noted that, as described above, in the present embodiment, the asset ownership of the battery pack 11 belongs to the intermediary agent 23 and the stakeholders at levels lower than the final product manufacture 25 has a duty of returning the battery pack 11.

In the present embodiment, the final product 13 is an electric motorcycle driven with the battery pack 11 and is operated by one or more final product operators 27. The final product 13 is one example of an external apparatus that can connect to the battery pack 11 and is also one example of an electric apparatus that utilizes the electrical power accumulated in the battery pack 11. In other words, in the present embodiment, the external apparatus is an electric apparatus.

The final product 13 obtains a first identification information for identifying an identity of the battery pack 11 from an internal memory of the battery pack 11 connected to the final product 13. The final product 13 also measures the data for the battery pack 11 for calculating the degradation level of the battery pack 11, for example, the amount of electric charge transferred by electric current of one ampere flowing for one hour (ampere hour, Ah), Open Circuit Voltage (OCV), State Of Charge (SOC), the amount of change thereof per unit time, or the like. It should be noted that these data may be measured by a sensor built in the battery pack 11, and, in this case, the final product 13 may obtain said measured data from the battery pack 11. It should be noted that, in the following description, the data used for calculating the degradation level of the battery pack 11 may be referred to as degradation level related information.

The final product 13 stores the second identification information in the internal memory for identifying the final product 13. The final product 13 includes communication means and uploads the battery pack information including the first identification information and the second identification information to the management server 100 via the communication network 50. As one specific example, the final product 13 may upload the battery pack information to the management server 100 via the communication network 50, i.e. Over The Air (OTA), at a timing of IGOFF, for example, each time the final product 13 finishes utilizing the electrical power of the battery pack 11 and is powered off.

In the present embodiment, the battery pack information uploaded by the final product 13 to the management server 100 further includes degradation level information indicating the degradation level of the battery pack 11. Said degradation level is calculated by the final product 13 based on the data measured as described above.

In the present embodiment, the management server 100 is managed, operated and maintained by the intermediary agent 23. The intermediary agent 23 may be the company that is the same as the battery pack manufacture 21, and, in this case, it is considered that the battery pack 11 is managed, operated and maintained by the battery pack manufacture 21. It should be noted that the management server 100 is one example of the system.

The management server 100 receives the battery pack information via the communication network 50 from the final product 13 and identifies the discount rate for the use fee of the battery pack 11 based on the battery pack information. The management server 100 identifies said discount rate such that said discount rate is higher when the number of times the battery pack 11 is replaced among the plurality of final products 13 is higher. The management server 100 in the present embodiment further calculates the use fee of the battery pack 11 based on said discount rate.

In the present embodiment, the management server 100 identifies said discount rate for the use fee that the final product manufacture 25 pays to the intermediary agent 23 in exchange for receiving the provision of the battery pack 11, i.e. lease fee. It should be noted that, additionally or alternatively, the management server 100 may identify said discount rate for the use fee that the final product operator 27 pays to the final product manufacture 25 in exchange for receiving the provision of the final product 13 loaded with the battery pack 11. In this case, the management server 100 may be managed, operated and maintained by the final product manufacture 25.

In the present embodiment, for achieving the purpose described above, the intermediary agent 23 managing the management server 100 gives to the final product manufacture 25 an incentive of discounting the lease fee of the battery pack 11 in a case where the final product manufacture 25 loads one battery pack 11 into the plurality of final product 13 and then fully utilizes, i.e., uses up, said battery pack 11. It should be noted that the battery pack 11 may also be, for example, a lithium-ion battery and the service life of the battery pack 11 may be about three times longer than the service life of the final product 13.

The final product manufacture 25 that is given such an incentive reuses one battery pack 11 among the plurality of final products 13 to increase the revenue of the use fee collected from the final product operator 27. In addition, the final product manufacture 25 can not only reduce expenses of the lease fee by reducing the number of lease contracts of the battery pack 11 newly signed with the intermediary agent 23, but can also reduce said expenses even more due to the discount on said lease fee as described above.

In this way, the lease fee calculation system 10 gives the above-described incentive to the final product manufacture 25 to prompt the final product manufacture 25 to spontaneously increase the operation rate of the battery pack 11, thereby achieving the above-described purpose.

In the present embodiment, the information terminal 30 is, for example, a communication display device such as a personal computer, a tablet, a smartphone, or the like, and is managed by the final product manufacture 25. In the present embodiment, the final product manufacture 25 uses the information terminal 30 to inquire about the price of the lease fee when it returns the battery pack 11 to the intermediary agent 23.

Figure 2:
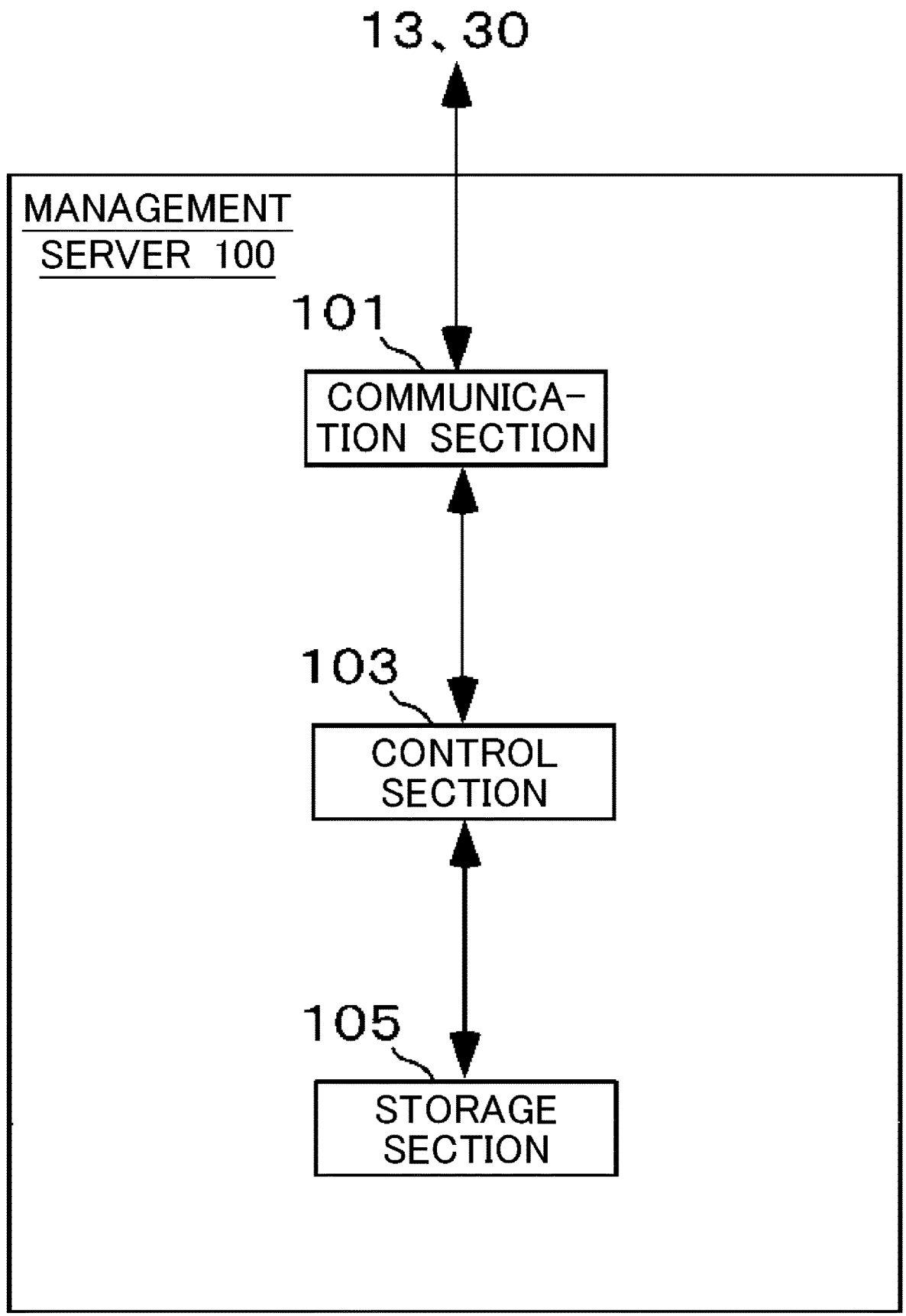
FIG. 2 is a block diagram of a management server 100 in one embodiment.

FIG. 2 is a block diagram of the management server 100 in one embodiment. The management server 100 includes a communication section 101, a control section 103, and a storage section 105. It should be noted that the control section 103 is one example of the identification section and the calculation section.

The communication section 101 receives the battery pack information including the first identification information and the second identification information from the final product 13 via the communication network 50. The communication section 101 also receives from the information terminal 30 the request for the use fee of the battery pack 11 to be displayed, i.e. the use fee display request, along with the first identification information. The communication section 101 outputs the received information to the control section 103.

If the communication section 101 receives the use fee information from the control section 103 as an input, it returns said information to the information terminal 30 that requested said information. It should be noted that, when the communication section 101 sends/receives the information to/from the information terminal 30, an IP address or the like for identifying the information terminal 30 is added to said information.

If the control section 103 receives the battery pack information from the communication section 101 as an input, it stores said battery pack information in the storage section 105. The control section 103 also refers to the storage section 105 to identify, based on said battery pack information, the number of times the battery pack 11 has been replaced among the plurality of final products 13.

The control section 103 also identifies the discount rate of the battery pack 11 based on the identified number of times and the discount rate table stored in the storage section 105. The control section 103 in the present embodiment further refers to the storage section 105 to calculate the use fee of the battery pack 11 based on said discount rate of the battery pack 11. More specifically, the control section 103 refers to the storage section 105 to calculate the use fee of the battery pack 11 based on said discount rate of the battery pack 11 and the payment plan information of the battery pack 11.

The storage section 105 stores the discount rate table described above. Said discount rate table is a table showing the relationship between the number of times any battery pack 11 has been replaced among the plurality of final products 13 and the discount rate on the use fee of any battery pack 11. Said relationship indicates that said discount rate is higher when said number of times is higher.

The storage section 105 also stores the battery pack information described above. In the present embodiment the storage section 105 cumulatively stores the history of the battery pack information. It should be noted that the storage section 105 may also store only the newest battery pack information for each battery pack 11. In other words, the battery pack information may be overwritten in the storage section 105.

The storage section 105 in the present embodiment further stores the payment plan information described above. Said payment plan information is the information indicating the payment plan of the use fee that is set for the battery pack 11. It should be noted that the storage section 105 is one example of the storage apparatus.

Figure 3:
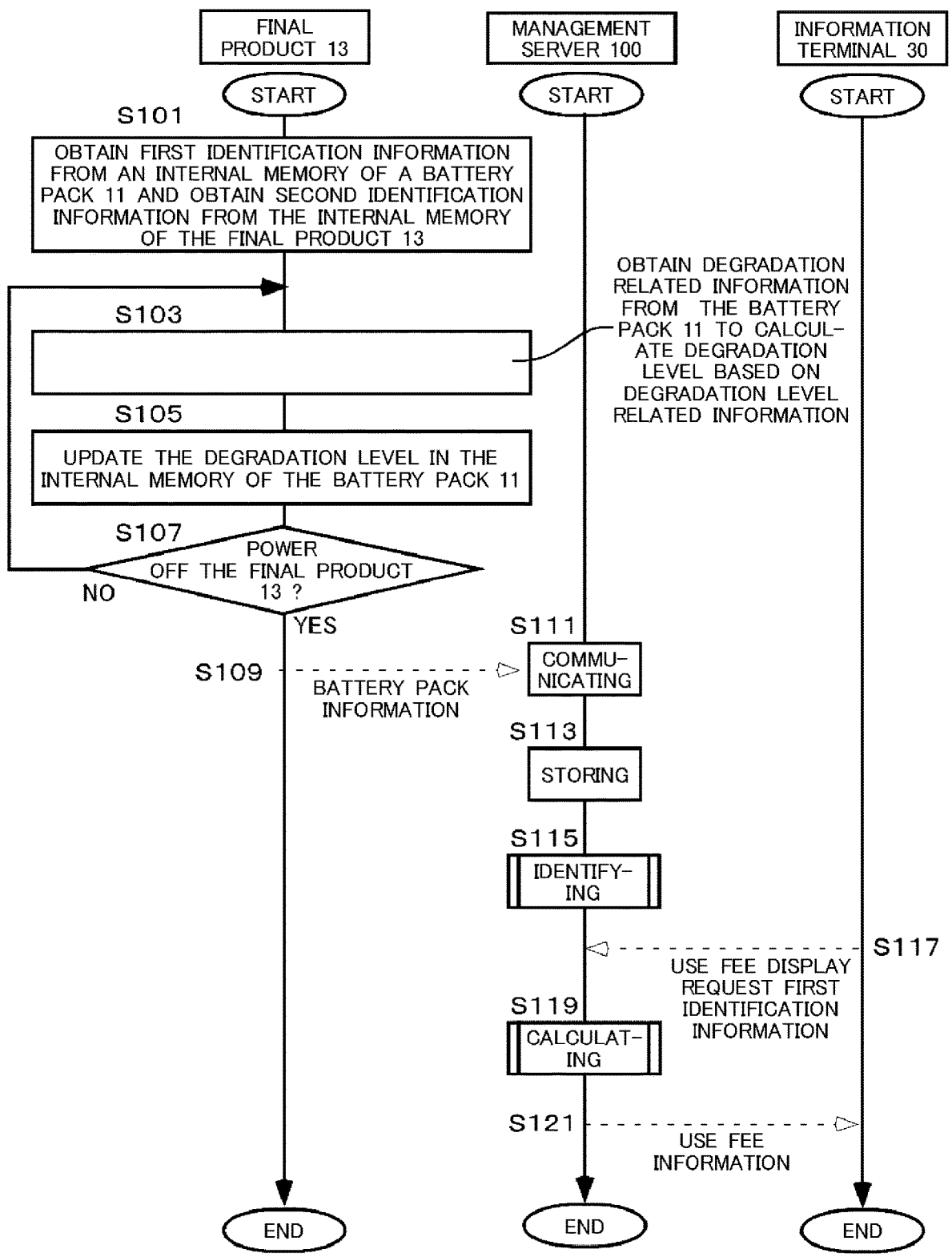
FIG. 3 is a flowchart of a use fee calculation method in one embodiment.

FIG. 3 is a flowchart of a use fee calculation method in one embodiment. The procedure in FIG. 3 may start when, as one example, the final product 13 that is connected to the battery pack 11 and utilizes the electrical power accumulated in the battery pack 11 is powered on.

The final product 13 obtains the first identification information from the internal memory of the battery pack 11 connected to the final product 13 and obtains the second identification information from the internal memory of the final product 13 (step S101). The final product 13 obtains the degradation level related information from the battery pack 11 and calculates the degradation level based on the degradation level related information (step S103).

The final product 13 updates the degradation level in the internal memory of the battery pack 11 (step S105) and repeats step S103 to step S105 until the final product 13 is powered off (step S107: NO). As one specific example, the loop of step S103 to S107 may be performed for a duration of 100 ms.

In response to the final product 13 being powered off (step S107: YES), the final product 13 sends the battery pack information to the management server 100 via the communication network 50 (step S109). In this way, the battery pack information is uploaded from the final product 13 to the management server 100 via the communication network 50 each time the final product 13 finishes utilizing the electrical power of the battery pack 11 and then is powered off. In this way, the management server 100 can appropriately and constantly identify the discount rate of the battery pack 11 based on the newest battery pack information regardless of the timing when the battery pack 11 is returned from the final product manufacture 25 to the intermediary agent 23.

The management server 100 performs the communicating step to receive the battery pack information from the final product 13 via the communication network 50 (step S111), and performs the storing step to store said battery pack information in the storage section 105 (step S113). Said storing step includes storing, by the management server 100, the discount rate table described above in the storage section 105 in advance.

The management server 100 performs the identifying step to refer to the storage section 105, identify, based on the battery pack information, the number of times the battery pack 11 has been replaced among the plurality of final products 13, and identify the discount rate of the battery pack 11 based on the identified number of times and the discount rate table (step S115). The management server 100 performs the calculating step to receive the use fee display request described above and the first identification information from the information terminal 30 via the communication network 50 (step S117), then refer to the storage section 105, and calculate the use fee of said battery pack 11 based on the discount rate of the battery pack 11 identified in said first identification information (step S119).

The management server 100 sends the use fee information indicating the calculated use fee to the information terminal 30 via the communication network 50 (step S121), and then ends said procedure. Said procedure may be repeated each time the final product 13 is powered on, as one example.

It should be noted that, in said procedure, steps S117 to S121 may be omitted. In other words, if the management server 100 does not receive the use fee display request or the like from the information terminal 30, it may perform the identifying step described above and end the said procedure. In addition, the steps S117 to S121 may be independent of said procedure. In other words, the management server 100 may perform steps S119 to S121 at any timing in response to receiving the use fee display request or the like from the information terminal 30.

Figure 4:
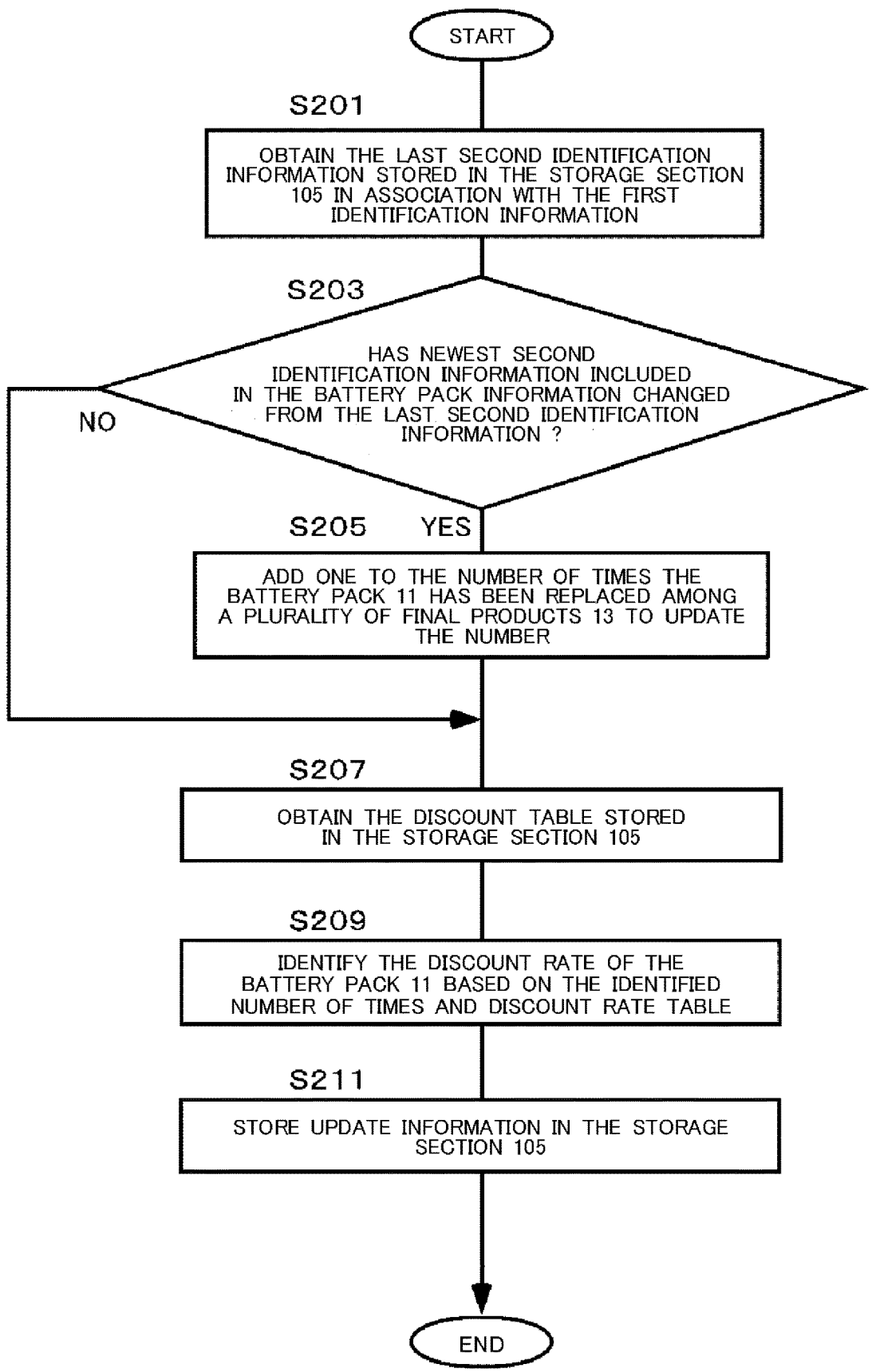
FIG. 4 shows a subroutine of a procedure of a use fee calculation method shown in FIG. 3.

FIG. 4 shows a subroutine of a procedure of the use fee calculation method shown in FIG. 3. In the present embodiment, if the management server 100 performs the identifying step of step S115 in the procedure of FIG. 3, it performs the procedure shown in FIG. 4.

The management server 100 obtains the last second identification information stored in the storage section 105 in association with the first identification information (step S201). Said last second identification information is not the newest second identification information that the control section 103 of the management server 100 newly stores in the storage section 105 in step S113 of FIG. 3, but the second identification information that is stored in the storage section 105 in association with the first identification information immediately before said second identification information.

The management server 100 determines whether the newest second identification information included in the battery pack information received in step S111 of FIG. 3 has changed from the last second identification information (step S203). If the second identification information has changed (step S203: YES), the management server 100 adds one to the number of times the battery pack 11 has been replaced among the plurality of final products 13 to update said number of times (step S205).

Specifically, the control section 103 of the management server 100 identifies the number of replacement by considering the change of the second identification information as the battery pack 11 being replaced from one final product 13 to another final product 13. More specifically, each time the communication section 101 receives the battery pack information, the control section 103 determine whether the newest second identification information included in the battery pack information has changed relative to the last second identification information stored in the storage section 105 in association with the first identification information. If the second identification information has changed, the control section 103 further adds one to the number of times stored in the storage section 105 to update said number of times. If the battery pack 11 is loaded to the final product 13 for the first time, said number of times is zero. If the battery pack 11 is loaded to the final product 13 at the second time, said number of times is one.

The management server 100 obtains the discount rate table stored in the storage section 105 (step S207), and identifies the discount rate of the use fee of the battery pack 11 based on the identified number of replacement and said discount rate table (step S209). In step S203 described above, the management server 100 also proceeds to step S207 if it determines that the second identification information has not changed.

The management server 100 stores the update information including the newest battery pack information in association with the first identification information of the battery pack 11 and the identified number of replacement and discount rate in the storage section 105 (step S211), and ends said procedure.

As described in the procedure of FIG. 4, in the present embodiment, each time the communication section 101 receives the battery pack information, the control section 103 of the management server 100 identifies the number of replacement of the battery pack 11 of the first identification information included in said battery pack information to identify the discount rate, and stores the identified discount rate in the storage section 105 along with the battery pack information.

FIG. 5 is one example of a battery pack information table stored in a storage section 105 of the management server 100 in one embodiment. In the battery pack information table in FIG. 5, the first row indicates the names of items of each column. Specifically, the first column indicates the battery pack ID, which is the first identification information of the battery pack 11, and the second column indicates the final product ID, which is the second identification information of the final product 13. The third column indicates an ID acquisition date and time. Said ID acquisition date and time refers to the date and time when the final product 13 is powered on and the battery pack ID and the final product ID are obtained.

The fourth column indicates a degradation rate at the time when the final product 13 starts using the battery pack 11, i.e., the ID acquisition date and time. It should be noted that the value of said degradation rate becomes lower than 100 as the degradation proceeds, wherein 100 corresponds to the state in which the battery pack 11 has no degradation. The degradation level described above may refer to the degree with which said value decreases. It should be noted that, as described above, in the present embodiment, the final product 13 calculates the degradation level of the battery pack 11 to update the degradation level stored in the internal memory of the battery pack 11, but the final product 13 may temporarily store the degradation level at the ID acquisition date and time in the internal memory of the final product 13. In this way, the management server 100 can store the degradation rate at the start of use in the fourth column of said table.

The fifth column indicates the date and time when the final product 13 to which the battery pack 11 is connected finishes using the battery pack 11, i.e. the date and time when the final product 13 is powered off, i.e. the date and time when the battery pack information is uploaded from the final product 13 to the management server 100. The sixth column indicates the degradation rate of the battery pack 11 at the time when the final product 13 finishes using the battery pack 11. The seventh column and the eighth column each indicates the number of times the battery pack 11 has been loaded to different final products 13 identified by the management server 100, i.e. the number of product load, and the discount rate based on said number of times or the like.

As indicated in the second row and the following rows of the table in FIG. 5, the storage section 105 of the management server 100 in the present embodiment stores the history of the battery pack information received by the communication section 101 and the number of replacement and discount rate identified by the control section 103 in association with each other. More specifically, each time the control section 103 of the management server 100 receives the battery pack information from the final product 13 via the communication section 101, it stores the first identification information of the battery pack 11 connected to said final product 13, the second identification information of said final product 13, and the degradation level information of said battery pack 11, which are included in said battery pack information, in the storage section 105 in association with the number of replacement and discount rate identified based on said battery pack information.

The control section 103 of the management server 100 in the present embodiment identifies said number of replacement, said degradation level information, and the discount rate on the use fee of the battery pack 11 based on the discount rate table stored in the storage section 105.

FIG. 6 is one example of a discount rate table stored in the storage section 105 of the management server 100 in one embodiment. In the discount rate table in FIG. 6, the first row indicates that the information indicated in the third column to the fifth column is the number of product load, and the second row indicates the number of product load: 1 to 4. In addition, the first column indicates that the information indicated in the third row to the sixth row is the indicator of the degradation level and the second column indicates the indicator of the degradation level: A to D. A is meant for the lowest degradation level, i.e. no degradation, and proceeding from B to D is meant for the increasing degradation level, i.e., more degraded.

In addition, in discount rate table, the discount rate is indicated with six steps: X1 to X6. X1 is meant for the lowest discount rate, and the discount rate increases from X2 to X6. Said discount rate table indicates the relationship among the degradation level for any battery pack 11, the number of times any battery pack 11 has been replaced among the plurality of final products 13, and the discount rate on the use fee of any battery pack 11. In addition, as understood from the table in FIG. 6, said relationship indicates that the discount rate is higher when the number of replacement is higher, and the discount rate is higher when the degradation level is lower.

Figure 7:
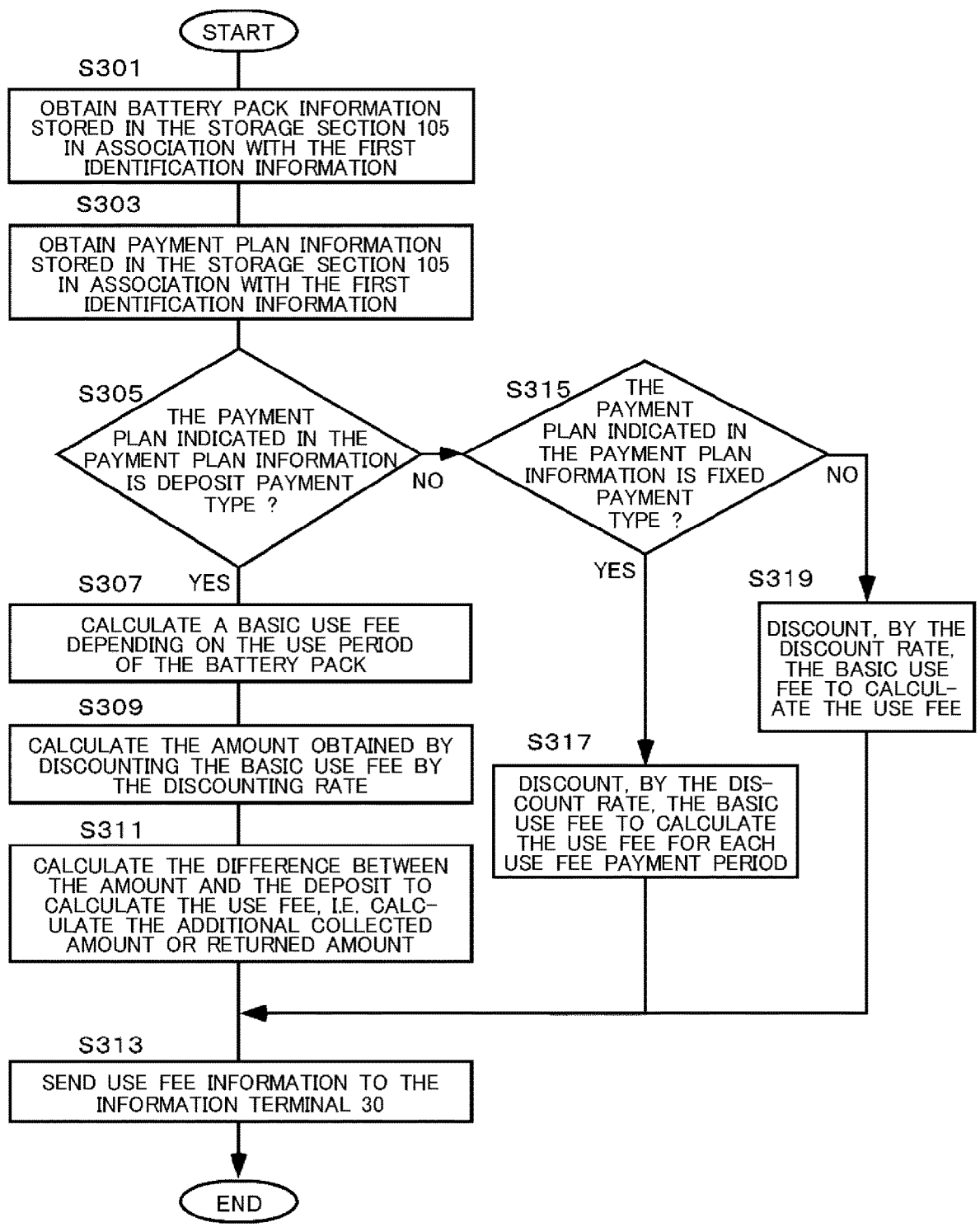
FIG. 7 shows a subroutine of the procedure of the use fee calculation method shown in FIG. 3.

FIG. 7 indicates the subroutine of the procedure of the use fee calculation method shown in FIG. 3. In the present embodiment, the management server 100 performs the procedure shown in FIG. 7 if it performs the calculating in step S119 of the procedure in FIG. 3.

The management server 100 obtains the battery pack information stored in the storage section 105 in association with said first identification information, based on the first identification information received from the information terminal 30 (step S301). The management server 100 also obtains the payment plan information stored in the storage section 105 in association with the first identification information (step S303).

If the payment plan indicated in said payment plan information is neither the deposit payment type (step S305: NO) nor the fixed amount payment type (step S315: NO), i.e. is the specific amount payment type, the management server 100 calculates the use fee by discounting, by the discount rate, the basic use fee (step S319). The management server 100 further sends the use fee information to the information terminal 30 (step S313) and ends said procedure.

Figure 8:
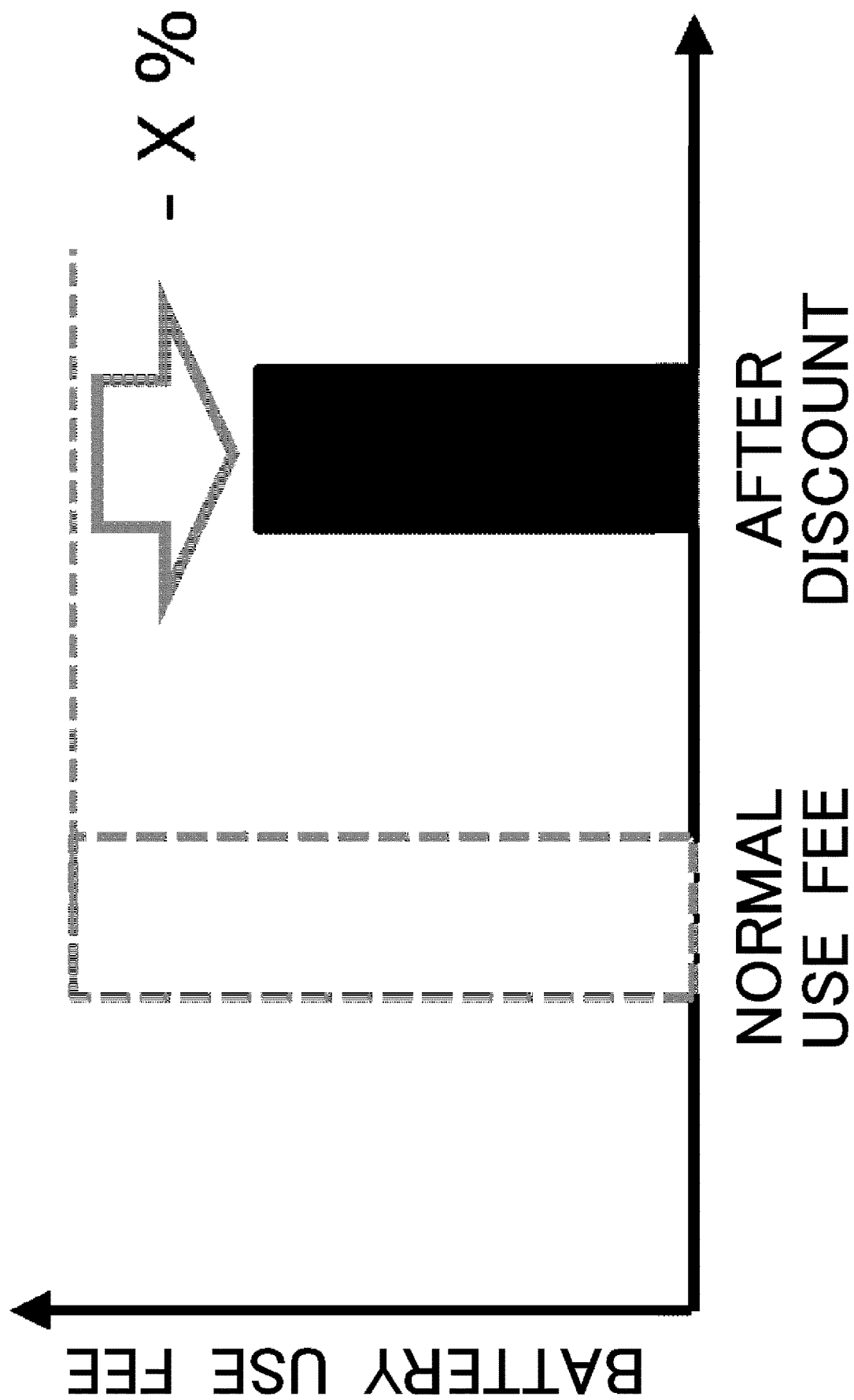
FIG. 8 is an illustration for describing a payment plan of a specific amount payment type.

The payment plan of the specific amount payment type will be herein described with reference to the illustration shown in FIG. 8. The vertical axis of the graph indicated in FIG. 8 refers to the use fee of the battery and the horizontal axis indicates the normal use fee (left) and the discounted use fee (right). As indicated in FIG. 8, if the payment plan indicated in the payment plan information is the specific amount payment type, the control section 103 of the management server 100 calculates the use fee by discounting, by the discount rate (−X %), the predetermined basic use fee at the end of use of the battery pack 11.

With reference to the procedure in FIG. 7 again, if said payment plan indicated in the payment plan information is the deposit payment type (step S305: YES), the management server 100 calculates the basic use fee according to the use period of the battery pack 11 (step S307) and then calculates the amount obtained by discounting, by the discount rate, the basic use fee (step S309). The management server 100 further calculates the difference between the deposit and said amount to calculate the use fee, i.e. calculates the additional collected amount or the refund amount (step S311), sends the use fee information to the information terminal 30 (step S313), and ends said procedure.

The payment plan of the deposit payment type will be herein described with reference to the illustration shown in FIG. 9. In the graph indicated in FIG. 9, the vertical axis refers to the payment use fee and the horizontal axis refers to the use period of the battery pack 11, i.e. lease period.

Figure 9:
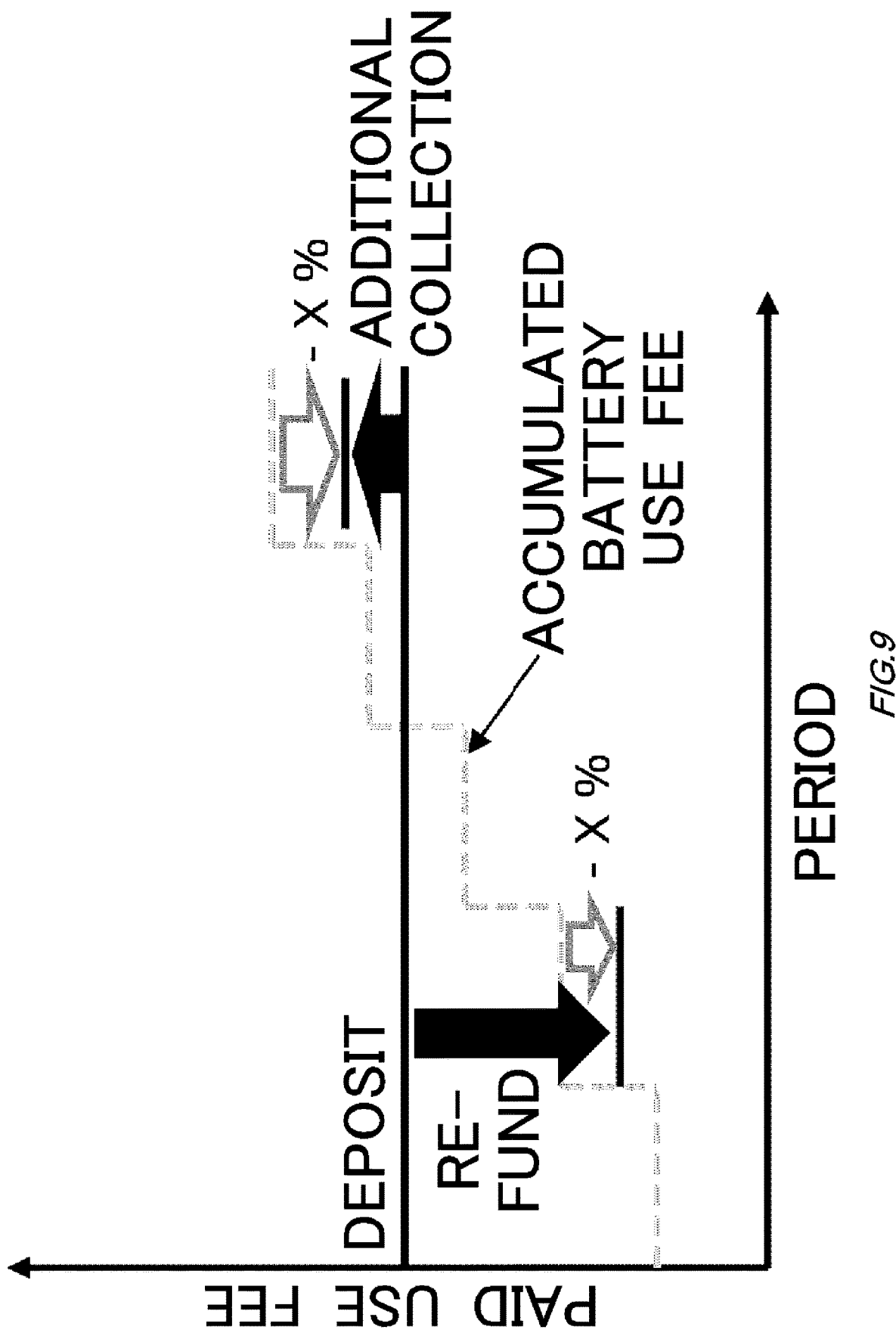
FIG. 9 is an illustration for describing a payment plan of a deposit payment type.

In the graph in FIG. 9, the deposit that is paid in advance by the final product manufacture 25 to the intermediary agent 23 is indicated with a solid line, and the accumulated battery use fee of the battery pack 11, i.e. the basic use fee predetermined to increase gradually at an interval of a certain period from the start of use of the battery pack 11 is indicated with a broken line. In addition, the graph of FIG. 9 exemplifies two use end times of the battery pack 11 and indicates the use fee in each of use end times with black arrows. In addition, on the graph in FIG. 9, an outlined arrow indicates that the basic use fee (−X %) at said two use end times is discounted by a discount rate.

As shown in FIG. 9, if the payment plan indicated in the payment plan information is the deposit payment type, the control section 103 of the management server 100 calculates, at the end of use of the battery pack 11, the use fee by calculating the difference between (1) the deposit described above and (2) the amount obtained by discounting, by the discount rate, the basic use fee at the end of use among the basic use fee described above. In the example of FIG. 9, the control section 103 calculates the refund amount as said use fee during the period when the accumulated battery use fee is lower than the deposit, and calculates the additional collected amount as said use fee during the period when the accumulated battery use fee is higher than the deposit.

With reference to the procedure in FIG. 7 again, in a case where the payment plan indicated in said payment plan information is not the deposit payment type (step S305: NO) but is the fixed amount payment type (step S315: YES), the management server 100 calculates the use fee for each use fee payment period by discounting, by the discount rate, the basic use fee (step S317). The management server 100 further sends the use fee information to the information terminal 30 (step S313) and ends said procedure.

Figure 11:
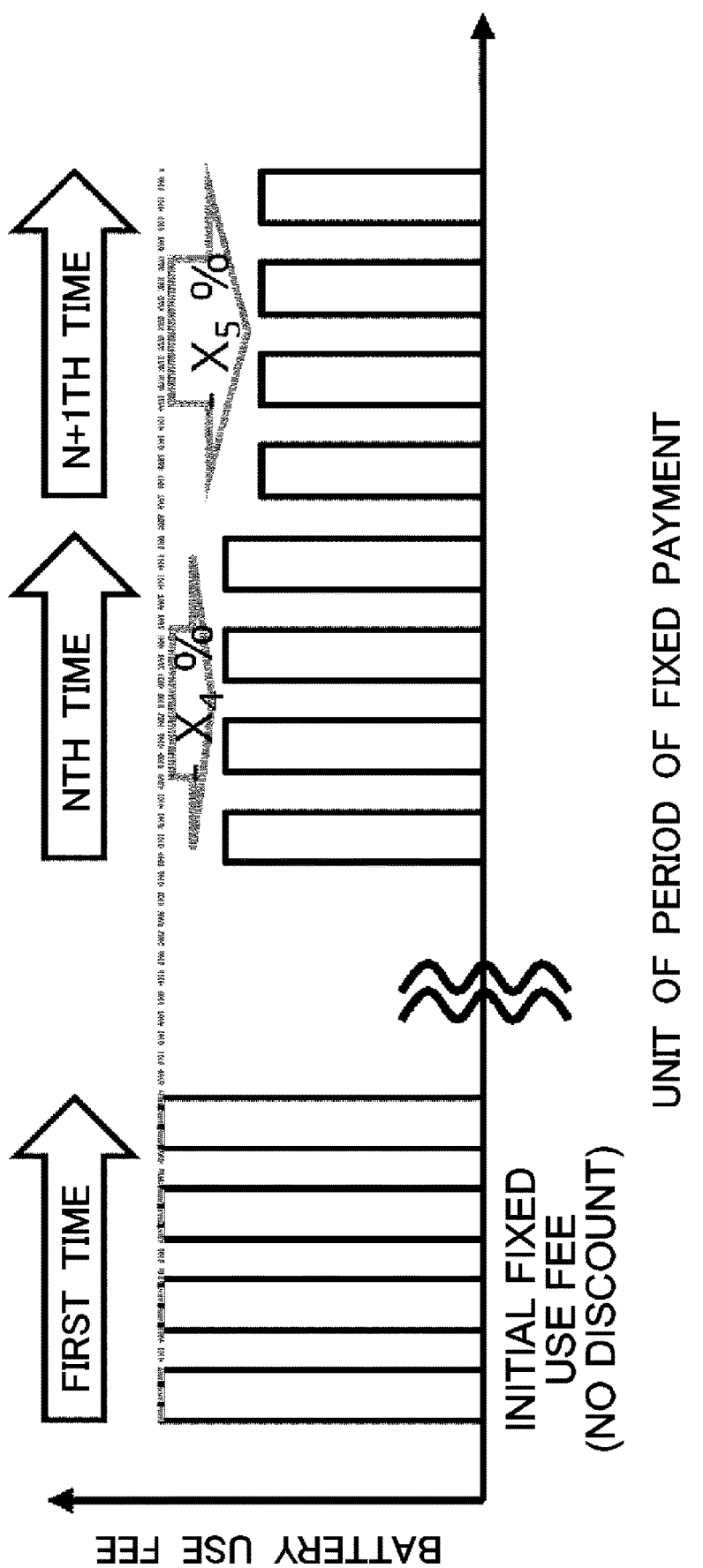
FIG. 11 is an illustration for describing a payment plan of a fixed amount payment type.

Here, reference is made to one example of the battery pack information table stored in the storage section 105 of the management server 100 in one embodiment shown in FIG. 10, and the illustration for describing the payment plan of the fixed amount payment type shown in FIG. 11. Unlike the battery pack information table shown in FIG. 5, the battery pack information table shown in FIG. 10 indicates the use fee for each use fee payment period in the eighth column of the table. It should be noted that it is the same as the battery pack information table shown in FIG. 5 in the other aspects and the redundant descriptions are omitted.

In addition, in the graph shown in FIG. 11, the vertical axis refers to the use fee of the battery, and the horizontal axis refers to the unit of the fixed amount payment period, i.e. the use fee payment periods that are set at an interval of a certain period from the start of use of the battery pack 11. In addition, it indicates that the initial fixed use fee (no discount) is applied to the left end on the horizontal axis, i.e. the initial use fee payment period that is set during a first certain period from the start of use of the battery pack 11. In addition, on the graph, the number of times of use fee payment period is indicated on the outlined arrows as Lth time (L=1, 2, . . . , n, n+1, . . . ). In addition, the discount rate for each use fee payment period is indicated on the outlined arrow. In the illustrated example, it is $-X_4$% at nth time and is $-X_5$% at n+1th time.

As shown in FIG. 11, if the payment plan indicated in the payment plan information is the fixed amount payment type, the control section 103 of the management server 100 calculates the use fee for each use fee payment period by discounting, by the discount rate, the predetermined basic use fee for each use fee payment period that is set at an interval of a certain period from the start of use of the battery pack. In addition, as shown in FIG. 10, the use fee calculated for each use fee payment period is stored in the storage section 105 in association with the information such as the discount rate for each use fee payment period.

It should be noted that, for the procedure in FIG. 7, step S305 to S311 and step S319 may be performed by the management server 100 at the timing when the battery pack 11 is returned by the final product manufacture 25 to the intermediary agent 23. In other words, if the final product manufacture 25 rents the battery pack 11 from the intermediary agent 23 with the payment plan of the deposit payment type or specific amount payment type, it sends the use fee display request or the like from the information terminal 30 to the management server 100 at the timing when it returns the battery pack 11 to the intermediary agent 23, and the use fee is calculated at the management server 100.

On the other hand, step S317 may also be performed by the management server 100 during the period when the battery pack 11 is used by the final product manufacture 25 or the final product operator 27, or at the timing when the battery pack 11 is returned to the intermediary agent 23. In other words, if the final product manufacture 25 rents the battery pack 11 from the intermediary agent 23 with the payment plan of the fixed amount payment type, it sends the use fee display request or the like from the information terminal 30 to the management server 100 each time a certain period elapses from the start of use of the battery pack 11, i.e. every use fee payment period, and the use fee is calculated at the management server 100. Therefore, as shown in FIG. 10, the newest use fee is preferably calculated and stored in the storage section 105 every time the management server 100 receives the battery pack information from the final product 13.

As described above, according to the management server 100 in the present embodiment, the battery pack information is received from the final product 13 via the communication network 50 and the discount rate on the use fee of the battery pack 11 is identified based on the battery pack information. The management server 100 identifies said discount rate such that said discount rate is higher when the number of times the battery pack 11 has been replaced among the plurality of final products 13 is higher. In this way, the management server 100 can give an incentive of said discount rate to the final product manufacture 25, which can contribute to increasing the utilization rate of the battery pack 11.

In the embodiment described above, an aspect is described where the control section 103 of the management server 100 identifies the discount rate for the battery pack 11 that is currently being used or will be returned to the intermediary agent 23 by the final product manufacture 25 and calculates the use fee of said battery pack 11 based on said discount rate. Alternatively, if the payment plan indicated in the payment plan information is the next use fee discount type and the specific amount payment type, the control section 103 of the management server 100 may discount, by the discount rate, the predetermined basic use fee at the end of use of a second battery pack 11 that is used following the battery pack 11 to calculate the use fee of the second battery pack 11. Similarly, if the payment plan indicated in the payment plan information is the next use fee discount type and the deposit payment type, the control section 103 of the management server 100 may calculate the difference between (1) the deposit paid in advance and (2) the amount obtained by discounting, by the discount rate, the basic use fee at the end of use among the basic use fee predetermined to increase gradually at an interval of a certain period from the start of use of the second battery pack 11, at the end of use of a second battery pack 11 that is used following the battery pack 11, to calculate the use fee of the second battery pack 11.

In addition, in the embodiment described above, the final product 13 is described as one example of an external apparatus. The external apparatus may be an apparatus that is different from the electric apparatus such as the final product 13 and reads the battery pack information from the battery pack 11 without utilizing the electrical power of the battery pack 11. Said apparatus may be, for example, a measurement apparatus to measure the degradation level of the battery pack 11. In this case, the battery pack information may be uploaded from said external apparatus to the management server 100 via the communication network 50.

In addition, in this case, the second identification information may be cumulatively stored in the internal memory of the battery pack 11 each time the battery pack 11 is loaded to the final product 13. Said measurement apparatus may obtain all said accumulated second identification information from the internal memory of the battery pack 11 and upload it to the management server 100 as the battery pack information. In addition, said measurement apparatus may be managed by, for example, the intermediary agent 23, and be connected to said battery pack 11 for performing the above-described process when the battery pack 11 is returned from the final product manufacture 25 to the intermediary agent 23. In addition, said measurement apparatus may be managed by, for example, the final product manufacture 25, and be connected to said battery pack 11 for performing the above-described process when the battery pack 11 is returned from the final product operator 27 to the final product manufacture 25.

In addition, in this case, in response to receiving from said measurement apparatus the battery pack information including a plurality of second identification information, the management server 100 may store all of them in the storage section 105 and perform identification by counting the number of replacement at once.

In addition, in the embodiment described above, the management server 100 is described as one example of the system. Each functional configuration of the system may be distributed to a plurality of servers, or a part of the functions may be distributed to the information terminal 30. For example, the management server 100 may identify the discount rate and notify the information terminal 30 of only the discount rate. In addition, for example, the management server 100 may store only the battery pack information in the storage section 105, and the information terminal 30 may identify the discount rate to calculate the use fee. In this case, the internal memory of the information terminal 30 may store the discount rate table or the payment plan information. In this case, the user handling the information terminal 30 can easily edit the discount rate table or the payment plan information.

It should be noted that, although the aspect in which the battery pack 11 is leased is described in the embodiment described above, the battery pack 11 may be rent.

It should be noted that, although the final product 13 is the motorcycle in the present embodiment, anything that can be driven with the battery pack 11 can be employed as the final product 13. For example, the final product 13 may be an electric vehicle such as a four-wheel motor vehicle or three-wheel motor vehicle, a lawnmower, a carriage truck, a stationary emergency power source, or the like.

It should be noted that, in the present embodiment, an aspect is described where the final product 13 uploads the battery pack information including the first identification information, the second identification information, and the degradation level information to the management server 100. Alternatively, the battery pack 11 may include control means and communication means, obtain the second identification information from the final product 13, and send the first identification information or the like to the management server 100. In addition, instead of the final product 13 or the like uploading the degradation level information to the management server 100, the final product 13 or the like may upload the data for calculating the degradation level of the battery pack 11 to the management server 100, and the management server 100 may calculate the degradation level of the battery pack 11 based on said data.

Various embodiments of the present invention may be described with reference to flowcharts and block diagrams whose blocks may represent (1) steps of processes in which operations are performed or (2) sections of apparatuses responsible for performing operations. Certain steps and sections may be implemented by dedicated circuitry, programmable circuitry supplied with computer-readable instructions stored on computer-readable media, and/or processors supplied with computer-readable instructions stored on computer-readable media. Note that dedicated circuitry may include digital and/or analog hardware circuits, and may include integrated circuits (IC) and/or discrete circuits. Programmable circuitry may include reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), and the like.

A computer-readable medium may include any tangible device that can store instructions to be executed by a suitable device, and as a result, the computer-readable medium having instructions stored thereon comprises an article of manufacture including instructions which can be executed to create means for performing operations specified in the flowcharts or block diagrams. Examples of computer-readable media may include an electronic storage medium, a magnetic storage medium, an optical storage medium, an electromagnetic storage medium, a semiconductor storage medium, etc. More specific examples of the computer-readable medium may include a Floppy (registered trademark) disk, a diskette, a hard disk, a random access memory (RAM), a read-only memory (ROM), an erasable programmable read-only memory (EPROM or Flash memory), an electrically erasable programmable read-only memory (EE- PROM), a static random access memory (SRAM), a compact disc read-only memory (CD-ROM), a digital versatile disk (DVD), a BLU-RAY (registered trademark) disc, a memory stick, an integrated circuit card, and the like.

Computer-readable instructions may include assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, JAVA (registered trademark), C++, etc., and conventional procedural programming languages, such as the "C" programming language or similar programming languages.

Computer-readable instructions may be provided to a processor of a general purpose computer, special purpose computer, or other programmable data processing apparatus, or to a programmable circuitry, locally or via a local area network (LAN), wide area network (WAN) such as the Internet, or the like, to execute the computer-readable instructions to create means for performing operations specified in the flowcharts or block diagrams. Examples of the processor include a computer processor, a processing unit, a microprocessor, a digital signal processor, a controller, a microcontroller, and the like.

Figure 12:
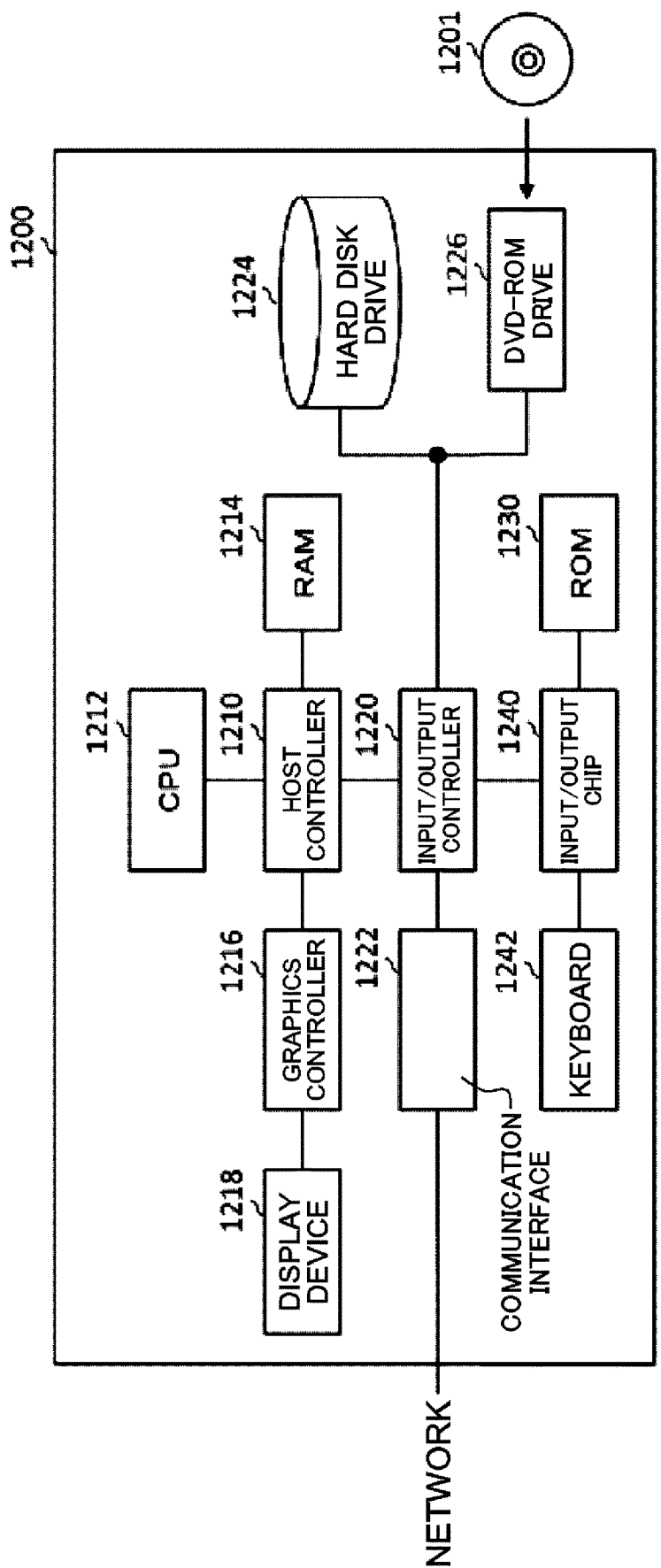
FIG. 12 is a diagram which shows an example of a computer 1200 in which a plurality of aspects of the present invention is wholly or partially embodied.

FIG. 12 shows an example of the computer 1200 which can realize a plurality of aspects of the present invention entirely or partially. A program installed on the computer 1200 can cause the computer 1200 to function as an operation associated with an apparatus according to embodiments of the present invention or as one or more "unit(s)" of the apparatus, or to perform the operation or the one or more "unit(s)", and/or can cause the computer 1200 to perform processes according to embodiments of the present invention or steps of the processes. Such a program may be executed by a CPU 1212 to cause the computer 1200 to perform particular operations associated with some or all blocks in the flowcharts or block diagrams described herein.

The computer 1200 according to the present embodiment includes a CPU 1212, a RAM 1214, a graphics controller 1216 and a display device 1218, which are connected to each other by a host controller 1210. The computer 1200 also includes input/output units such as a communication interface 1222, a hard disk drive 1224, a DVD-ROM drive 1226 and an IC card drive, which are connected to the host controller 1210 via an input/output controller 1220. The computer also includes legacy input/output units such as a ROM 1230 and a keyboard 1242, which are connected to the input/output controller 1220 via an input/output chip 1240.

The CPU 1212 operates in accordance with programs stored in the ROM 1230 and the RAM 1214, and controls each unit accordingly. The graphics controller 1216 acquires image data generated by the CPU 1212 on a frame buffer or the like provided in the RAM 1214 or in the graphics controller 1216 itself, and displays the image data on the display device 1218.

The communication interface 1222 communicates with other electronic devices via a network. The hard disk drive 1224 stores programs and data to be used by the CPU 1212 in the computer 1200. The DVD-ROM drive 1226 reads programs or data from the DVD-ROM 1201, and provides the programs or data to the hard disk drive 1224 via the RAM 1214. The IC card drive reads the program and data from the IC card, and/or writes the program and data to the IC card.

The ROM 1230 has stored therein a boot program or the like to be executed by the computer 1200 at the time of activation, and/or a program that depends on the hardware of the computer 1200. The input/output chip 1240 may also connect various input/output units to the input/output controller 1220 via a parallel port, a serial port, a keyboard port, a mouse port or the like.

Programs are provided by a computer-readable storage medium such as the DVD-ROM 1201 or an IC card. The programs are read from the computer-readable storage medium, installed on the hard disk drive 1224, the RAM 1214 or the ROM 1230, which are also examples of a computer-readable storage medium, and executed by the CPU 1212. The information processing described in these programs is read into the computer 1200, resulting in cooperation between a program and the above-mentioned various types of hardware resources. An apparatus or method may be constituted by realizing the operation or processing of information in accordance with the usage of the computer 1200.

For example, if a communication is performed between the computer 1200 and external devices, the CPU 1212 may execute a communication program loaded on the RAM 1214, and instruct the communication interface 1222 to perform communication process based on the process described in the communication program. Under the control of the CPU 1212, the communication interface 1222 reads transmission data stored in a transmission buffer region provided in a recording medium such as the RAM 1214, the hard disk drive 1224, the DVD-ROM 1201 or an IC card, and sends the read transmission data to the network, or writes reception data received from the network into a reception buffer region or the like provided in the recording medium.

The CPU 1212 may also make all or required portions of the files or databases stored in an external recording medium such as the hard disk drive 1224, the DVD-ROM drive 1226 (DVD-ROM 1201) or an IC card to be read by the RAM 1214, and perform various types of processing on the data on the RAM 1214. The CPU 1212 may be configured to write back the processed data to the external recording medium.

Various types of information such as various types of programs, data, tables and databases may be stored in the recording medium for information processing. The CPU 1212 may also be configured to execute various types of processing on the data read from the RAM 1214, which includes various types of operations, processing of information, condition judging, conditional branching, unconditional branching, search/replacement of information and the like described in the present disclosure and designated by an instruction sequence of programs, and to write the result back to the RAM 1214. The CPU 1212 may also be configured to search for information in a file, a database, etc., in the recording medium. For example, when a plurality of entries, each having an attribute value of a first attribute associated with an attribute value of a second attribute, are stored in the recording medium, the CPU 1212 may search the plurality of entries for an entry whose attribute value of the first attribute matches a designated condition, read the attribute value of the second attribute stored in the entry, and thereby acquire the attribute value of the second attribute associated with the first attribute that meets a predetermined condition.

The programs or software modules in the above description may be stored on the computer 1200 or a computer-readable storage medium near the computer 1200. Furthermore, a recording medium such as a hard disk or a RAM provided in a server system connected to a dedicated communication network or the Internet can be used as a computer-readable storage media, which provides programs to the computer 1200 via the network.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES 10 lease fee calculation system
11 battery pack
13 final product
21 battery pack manufacture
23 intermediary agent
25 final product manufacture
27 final product operator
30 information terminal
50 communication network
100 management server
101 communication section
103 control section
105 storage section
1200 computer
1201 DVD-ROM
1210 host controller
1212 CPU
1214 RAM
1216 graphics controller
1218 display device
1220 input/output controller
1222 communication interface
1224 hard disk drive
1226 DVD-ROM drive
1230 ROM
1240 input/output chip
1242 keyboard

What is claimed is:

1. A system comprising:
at least one processor;
a communication section receiving, using the at least one processor, from an external apparatus that can connect to a battery pack, via a communication network, battery pack information including first identification information for identifying an identity of the battery pack and second identification information for identifying an electric apparatus that is connected to the battery pack and utilizes electrical power accumulated in the battery pack;
a storage section storing, using the at least one processor, a discount rate table that indicates a relationship between a number of times any battery pack has been replaced among a plurality of electric apparatuses and a discount rate on a use fee of the any battery pack and storing the battery pack information received by the communication section, wherein the relationship indicates that the discount rate is higher when the number of times is higher; and
an identification section referring to, using the at least one processor, the storage section, identifying a number of times the battery pack has been replaced among a plurality of electric apparatuses based on the battery pack information, and identifying the discount rate of the battery pack based on the identified number of times and the discount rate table, wherein
in response to the external apparatus is powered on, the external apparatus obtains the first identification information from the battery pack and the second identification information from a memory of the external apparatus and repeats calculating a degradation level of the battery pack and updating the degradation level stored in the battery pack with the calculated degradation level until the external apparatus is powered off, and
in response to the external apparatus is powered off, the communication section receives, using the at least one processor, the battery pack information including the first identification information, the second identification information, and the updated degradation level.

2. The system according to claim 1, wherein the external apparatus is the electric apparatus and includes a management server including the communication section, the storage section, and the identification section,
wherein the battery pack information is uploaded from the external apparatus to the management server via the communication network.

3. The system according to claim 2, wherein the battery pack information is uploaded from the external apparatus to the management server via the communication network each time the external apparatus finishes utilizing the electrical power of the battery pack and is powered off.

4. The system according to claim 1, wherein the external apparatus is an apparatus that is different from the electric apparatus and reads the battery pack information from the battery pack without utilizing the electrical power of the battery pack, and includes a management server including the communication section, the storage section, and the identification section,
wherein the battery pack information is uploaded from the external apparatus to the management server via the communication network.

5. The system according to claim 1, wherein the identification section identifies, using the at least one processor, the number of times by considering a change in the second identification information as the battery pack being replaced from one electric apparatus to another electric apparatus.

6. The system according to claim 2, wherein the identification section identifies, using the at least one processor, the number of times by considering a change in the second identification information as the battery pack being replaced from one electric apparatus to another electric apparatus.

7. The system according to claim 3, wherein the identification section identifies, using the at least one processor, the number of times by considering a change in the second identification information as the battery pack being replaced from one electric apparatus to another electric apparatus.

8. The system according to claim 4, wherein the identification section identifies, using the at least one processor, the number of times by considering a change in the second identification information as the battery pack being replaced from one electric apparatus to another electric apparatus.

9. The system according to claim 5, wherein the storage section stores, using the at least one processor, a history of the battery pack information received by the communication section and the number of times and the discount rate identified by the identification section in association with each other, wherein each time the communication section receives the battery pack information, the identification section determines, using the at least one processor, whether newest one of the second identification information included in the battery pack information has changed from last one of the second identification information that is stored in the storage section in association with the first identification information, and, if confirming a change, updates the number of times by adding one to the number of times stored in the storage section.

10. The system according to claim 1, wherein the battery pack information further includes degradation level information indicating the degradation level of the battery pack, wherein the discount rate table indicates a relationship among a degradation level of the any battery pack, a number of times the any battery pack has been replaced among a plurality of electric apparatuses, a discount rate on a use fee of the any battery pack, and the relationship indicates that the discount rate is higher when the number of times is higher, and the discount rate is higher when the degradation level is lower.

11. The system according to claim 1, wherein the identification section identifies, using the at least one processor, the number of times of the battery pack to identify the discount rate and stores the identified discount rate in the storage section together with the battery pack information, each time the communication section receives the battery pack information.

12. The system according to claim 11, further comprising a calculation section referring to, using the at least one processor, the storage section and calculating a use fee of the battery pack based on the discount rate of the battery pack.

13. The system according to claim 12, wherein the storage section further stores, using the at least one processor, payment plan information indicating a payment plan of the use fee that is set for the battery pack, wherein the calculation section refers to, using the at least one processor, the storage section, and calculates the use fee based on the payment plan information of the battery pack and the discount rate identified by the identification section.

14. The system according to claim 13, wherein if the payment plan indicated in the payment plan information is a specific amount payment type, at an end of use of the battery pack, the calculation section discounts, using the at least one processor, the discount rate from a predetermined basic use fee to calculate the use fee.

15. The system according to claim 13, wherein if the payment plan indicated in the payment plan information is a deposit payment type, at an end of use of the battery pack, the calculation section calculates, using the at least one processor, a difference between (1) a deposit paid in advance and (2) an amount obtained by discounting, by the discount rate, a basic use fee at the end of the use among basic use fees predetermined to gradually increase at an interval of a certain period from a start of use of the battery pack to calculate the use fee.

16. The system according to claim 13, wherein if the payment plan indicated in the payment plan information is a next use fee discount type and a specific amount payment type, at an end of use of a second battery pack that is used following the battery pack, the calculation section discounts, using the at least one processor, the discount rate from a predetermined basic use fee to calculate a use fee of the second battery pack.

17. The system according to claim 13, wherein if the payment plan indicated in the payment plan information is a next use fee discount type and a deposit payment type, at an end of use of a second battery pack that is used following the battery pack, the calculation section calculates, using the at least one processor, a difference between (1) a deposit paid in advance and (2) an amount obtained by discounting, by the discount rate, a basic use fee at the end of use among the basic use fees predetermined to gradually increase at an interval of a certain period from a start of use of the second battery pack to calculate a use fee of the second battery pack.

18. The system according to claim 13, wherein if the payment plan indicated in the payment plan information is a fixed amount payment type, for each use fee payment period that is set at an interval of a certain period from a start of use of the battery pack, the calculation section discounts, using the at least one processor, the discount rate from a predetermined basic use fee to calculate the use fee for each of the use fee payment periods.

19. A method comprising:

communicating to receive, from an external apparatus that can connect to a battery pack, via a communication network, battery pack information including first identification information for identifying an identity of the battery pack and second identification information for identifying an electric apparatus that is connected to the battery pack and utilizes electrical power accumulated in the battery pack;

storing to store a discount rate table indicating a relationship between a number of times any battery pack has been replaced among a plurality of electric apparatuses and a discount rate on a use fee of the any battery pack in a storage apparatus, and store the battery pack information received in the communicating in the storage apparatus, wherein the relationship indicates that the discount rate is higher when the number of times is higher;

identifying to refer to the storage apparatus, identifying a number of times the battery pack has been replaced among a plurality of electric apparatuses based on the battery pack information, and identify the discount rate of the battery pack based on the identified number of times and the discount rate table;

in response to the external apparatus is powered on, obtaining, by the external apparatus, the first identification information from the battery pack and the second identification information from a memory of the external apparatus, repeating calculating a degradation level of the battery pack, and updating the degradation level stored in the battery pack with the calculated degradation level until the external apparatus is powered off; and in response to the external apparatus is powered off, receiving the battery pack information including the first identification information, the second identification information, and the updated degradation level.

20. A non-transitory computer-readable storage medium that stores a program for causing a computer to perform:

communicating to receive, from an external apparatus that can connect to a battery pack, via a communication network, battery pack information including first identification information for identifying an identity of the battery pack and second identification information for identifying an electric apparatus that is connected to the battery pack and utilizes electrical power accumulated in the battery pack;

storing to store a discount rate table indicating a relationship between a number of times any battery pack has been replaced among a plurality of electric apparatuses and a discount rate on a use fee of the any battery pack in a storage apparatus, and store the battery pack information received in the communicating in the storage apparatus, wherein the relationship indicates that the discount rate is higher when the number of times is higher;

identifying including referring to the storage apparatus, identifying a number of times the battery pack has been replaced among a plurality of electric apparatuses based on the battery pack information, and identifying the discount rate of the battery pack based on the identified number of times and the discount rate table;

in response to the external apparatus is powered on, obtaining, by the external apparatus, the first identification information from the battery pack and the second identification information from a memory of the external apparatus, repeating calculating a degradation level of the battery pack, and updating the degradation level stored in the battery pack with the calculated degradation level until the external apparatus is powered off; and in response to the external apparatus is powered off, receiving the battery pack information including the first identification information, the second identification information, and the updated degradation level.

* * * * *